US 011859765 B2

(12) United States Patent
Backhouse

(10) Patent No.: US 11,859,765 B2
(45) Date of Patent: Jan. 2, 2024

(54) STORAGE TANK FOR LIQUID HYDROGEN

(71) Applicant: ROLLS-ROYCE plc, London (GB)

(72) Inventor: Robert C. Backhouse, Wells (GB)

(73) Assignee: ROLLS ROYCE PLC, London (GB)

(*) Notice: Subject to any disclaimer, the term of this patent is extended or adjusted under 35 U.S.C. 154(b) by 0 days.

(21) Appl. No.: 17/825,329

(22) Filed: May 26, 2022

(65) Prior Publication Data
US 2022/0403980 A1 Dec. 22, 2022

(30) Foreign Application Priority Data

Jun. 16, 2021 (GB) ...................................... 2108562

(51) Int. Cl.
F17C 1/12 (2006.01)

(52) U.S. Cl.
CPC .......... *F17C 1/12* (2013.01); *F17C 2203/012* (2013.01); *F17C 2203/0607* (2013.01); *F17C 2203/0631* (2013.01); *F17C 2203/0673* (2013.01); *F17C 2221/012* (2013.01); *F17C 2260/013* (2013.01); *F17C 2270/0189* (2013.01)

(58) Field of Classification Search
CPC ...... F17C 1/12; F17C 1/06; F17C 1/04; F17C 1/02; F17C 2223/0161; F17C 2221/012; F17C 2270/0189; F17C 2209/2154; F17C 2203/0626; F17C 2203/0663; F17C 2203/012; F17C 2203/0607; F17C 2203/0631; F17C 2203/0621; F17C 2203/0673
USPC ...... 220/560.11, 560.12, 560.1, 560.04, 589, 220/588, 586, 62.19
See application file for complete search history.

(56) References Cited

U.S. PATENT DOCUMENTS 3,304,729 A * 2/1967 Chandler .................. F17C 3/02
62/48.3
3,415,408 A 12/1968 Seitz
(Continued)

FOREIGN PATENT DOCUMENTS

AU 2012280144 A1 * 12/2013 ......... B63B 17/0027
EP 2581201 B1 12/2016
(Continued)

OTHER PUBLICATIONS

Great Britain search report dated Dec. 6, 2021, issued in Patent Application No. GB2108562.6.
(Continued)

*Primary Examiner* — Robert J Hicks
(74) *Attorney, Agent, or Firm* — Crowell & Moring LLP

(57) ABSTRACT

A storage tank for liquid hydrogen comprises first and second shells each constructed of laminate material, the second shell being disposed outwardly of the first shell with respect to the centre of the storage tank. The first and second shells are mechanically connected by a first plurality of pins each of which passes through at least some layers of the second shell and at least some layers of the first shell. The storage tank may be constructed using a simpler manufacturing process involving less tooling and fewer process steps than is the case for known tanks for storing liquid hydrogen. The storage tank has also has a lower mass and reduced thermal losses compared to tanks of the prior art. The plurality of pins allows for the shells to be thinner, and hence lighter, than similar shells in tanks of the prior art.

18 Claims, 3 Drawing Sheets

(56) References Cited

U.S. PATENT DOCUMENTS

| | | | | |
|---|---|---|---|---|
| 3,487,971 | A | * | 1/1970 | Gay .................... F17C 13/088 |
| | | | | 62/51.1 |
| 3,951,362 | A | * | 4/1976 | Robinson ............... B64D 37/06 |
| | | | | 220/560.07 |
| 4,674,674 | A | | 6/1987 | Patterson et al. |
| 5,085,343 | A | | 2/1992 | Scarr |
| 5,726,529 | A | * | 3/1998 | Dean .................... H01J 29/028 |
| | | | | 220/918 |
| 8,893,367 | B2 | | 11/2014 | Lander |
| 10,307,973 | B2 | | 6/2019 | Lander et al. |
| 2006/0196876 | A1 | | 9/2006 | Rohwer |
| 2018/0141287 | A1 | | 5/2018 | Lander et al. |

FOREIGN PATENT DOCUMENTS

| | | | |
|---|---|---|---|
| JP | 2014074452 | A2 | 4/2014 |
| WO | 2004029503 | A2 | 4/2004 |

OTHER PUBLICATIONS

European Search Report dated Oct. 25, 2022, issued in EP Patent Application No. 22173942.8.

\* cited by examiner

STORAGE TANK FOR LIQUID HYDROGEN

CROSS-REFERENCE TO RELATED APPLICATIONS

This application is based upon and claims the benefit of priority from British Patent Application GB 2108562.6, filed on Jun. 16, 2021, the entire contents of which are hereby incorporated by reference.

BACKGROUND

Technical Field

The present disclosure relates to storage tanks suitable for storage of liquid hydrogen.

Description of Related Art

Storage of hydrogen is a critical enabling capability for sustainable power systems that do not rely on consumption of fossil fuels and emission of greenhouse gases. Hydrogen may be stored in ambient conditions in its gaseous state and for efficient storage this storage tends to be at high pressures, for example 400 bar or more. Alternatively, hydrogen may be stored in its liquid state at around −253'C and at low pressures of a few atmospheres (typically 2 to 4 bar). For aerospace propulsion applications, both gaseous hydrogen and liquid (cryogenic) hydrogen may be considered viable if the gravimetric efficiency of a storage system is sufficiently high and the safety and operation of the system are suitable to enable certification.

Gaseous storage tanks are based on metal, composite or hybrid combinations of the two. Their designs tend to be cylindrical and dominated by consideration of efficient ways to manufacture a high tensile strength pressure vessel and a metallic or polymer liner to control hydrogen gas diffusion through the tank wall.

Cryogenic liquid hydrogen tanks tend to be spherical and dominated by the need select materials with useful mechanical performance, durability at low temperatures, durability with respect to thermal cycling, the ability to efficiently insulate cold contents and to thermally/pressure-manage a tank to vent and control tank pressure and boil off. Tanks of more complex shape are possible as internal pressure is relatively low, a key challenge being to maintain tank integrity and gravimetric efficiency.

In one known design, a metallic vessel manufactured from aluminium alloy or similar material is surrounded by a very low density insulating foamed polymer, for example based on polyurethane. A large insulation thickness is required for thermal efficiency, wasting space which is particularly disadvantageous in aeronautical applications.

Another type of liquid hydrogen storage tank uses a carbon fibre composite or metallic inner vessel for containing liquid hydrogen, surrounded by an outer shell. A cavity exists between the inner vessel and the outer shell. The outer shell may be single skinned with stiffening elements (ribs or an iso-grid stiffening arrangement) or may be manufactured as a sandwich panel with a low density core, typically of foam or honeycomb materials. The (stiffened) outer shell allows air to be largely withdrawn from the cavity between the two shells. The cavity may be filled with insulation materials to further reduce tank heating from the surrounding environment. The insulation material may be in the form of pellets or powder materials (materials such as aerogels, vermiculite or alike), fibrous insulating materials (such as glass or ceramic materials or alike) or multi-layer insulation (MLI) which is formed on separated insulating and radiation reflective films, all of which are known in the prior art. The outer shell is usually manufactured in several parts to allow it to be constructed around the inner shell; this has the disadvantage of requiring several separate manufacturing steps and sets of tooling.

In a storage tank having an inner vessel surrounded by an outer shell, a load path is needed between the inner, liquid-containing, vessel and the outer shell and also provision for mounting the tank to an airframe or other structure. The load path typically takes the form of a supporting post that passes through the inner vessel and the outer shell, with a respective flanged connection to each, the post providing a connection for all services (e.g. filling, emptying, venting, and sensing or electrical connections) as well as providing the load path and accommodating thermal mismatch and/or thermal loading. However, the flanged connections compromise insulation efficiency, and both the flanged connections and supporting post contribute significantly to the overall weight of such a tank, thus comprising its gravimetric efficiency. Furthermore, manufacturing of such a tank is complex and requires a significant amount of tooling. Although unknown in the prior art, tanks having three (or more) shells would be useful for increasing the functionality of a storage tank for liquid hydrogen. However, the problems of poor gravimetric and thermal efficiencies, bulky volume and complex manufacturing associated with known liquid hydrogen storage tanks would increase further in the case of such multi-shell tanks.

SUMMARY

According to an example, a storage tank for liquid hydrogen comprises first and second shells each being constructed of laminate material, the second shell being disposed outwardly of the first shell with respect to the centre of the storage tank and wherein the first and second shells are mechanically connected by a first plurality of pins each of which passes through at least some layers of the second shell and at least some layers of the first shell.

The laminate material of at least one of the first and second shells may comprise carbon-fibre reinforced polymer composite material. Pins of the first plurality of pins may comprise one of cured carbon fibre composite material, cured glass fibre reinforced composite material, inorganic fibre composite material, metallic material and non-metallic material.

The storage tank may further comprise a third shell constructed of laminate material and disposed outwardly of the second shell, the second and third shells being mechanically connected by a second plurality of pins each of which passes through at least some layers of the third shell and at least some layers of the second shell.

Laminate material of the third shell may comprise carbon-fibre reinforced polymer composite material. Pins of the second plurality of pins may comprise one of cured carbon fibre composite material, cured glass fibre reinforced composite material, inorganic fibre composite material, metallic material and non-metallic material.

The first and second shells may each be constructed of carbon fibre reinforced polymer composite material, the first shell forming a first vessel for containing liquid hydrogen and the second shell forming a second vessel spaced apart from and surrounding the first vessel. The pins of the first plurality of pins may be thermally insulating. Pins of the first plurality of pins may have a diameter in the range 250 μm to 500 µm. One or more of the interior and exterior surfaces of the first and second vessels may each have a respective metallic coating. The space between the first and second vessels may be either evacuated or filled with an insulating material. The storage tank may further comprise a third shell disposed outwardly of the second shell and spaced apart therefrom and constructed of carbon fibre reinforced laminate material, the third shell forming a third vessel surrounding the first and second vessels, the second and third shells being mechanically connected by a second plurality of pins each of which passes through at least some layers of the third shell and at least some layers of the second shell. In this case, pins of the first plurality of pins may be thermally conductive and pins of the second plurality of pins may be thermally insulating. Pins of the first and second pluralities of pins may have a diameter in the range 250 µm to 500 µm. One or more of the interior and exterior surfaces of the first, second and third vessels may each have a respective metal coating. The space between the second and third vessels may either be evacuated or filled with insulating material. At least some pins of the first plurality of pins may extend into the interior of the first vessel. The storage tank may further comprise means providing for hydrogen to be recovered from the space between the first and second vessels. The storage tank may further comprise means for maintaining at least one of the temperature and the pressure of hydrogen within the space between the first and second vessels.

According to an example, an aircraft comprises a storage tank as set out above.

DESCRIPTION OF THE DRAWINGS

Examples are described below with reference to the accompanying drawings in which.

DETAILED DESCRIPTION

Figure 1:
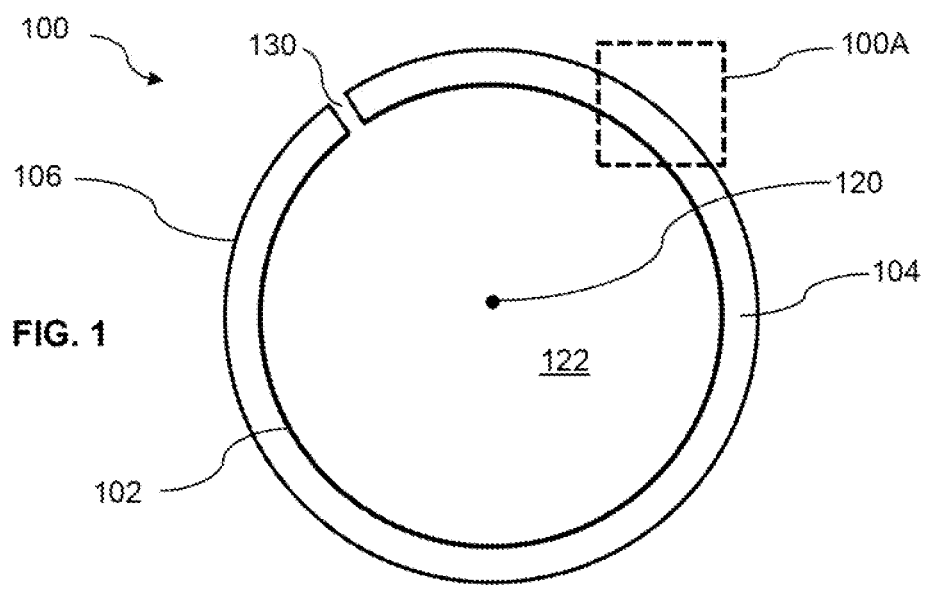
FIG. 1 shows a cross-section of a first example storage tank.
Figure 2:
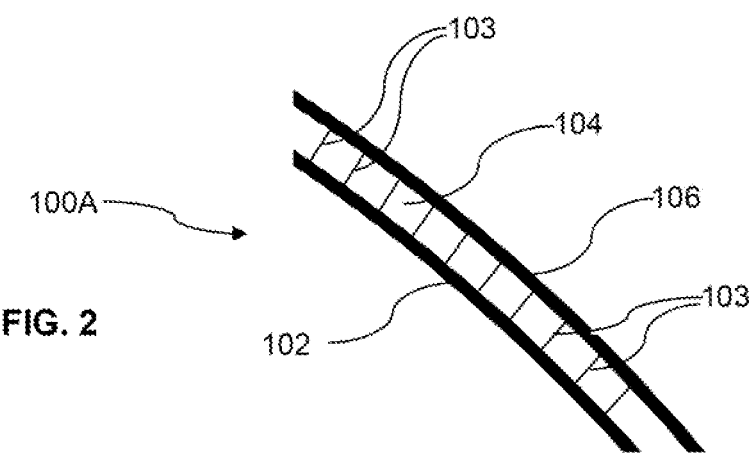
FIG. 2 shows a portion of the cross-section of FIG. 1 in detail.

Referring to FIGS. 1 and 2, a first example storage tank 100 for liquid hydrogen comprises first 102 and second 106 concentric hollow spherical shells which are mutually spaced apart defining an inter-sphere cavity 104. The first and second shells 102, 106 have a common centre 120 and are each constructed of a laminate comprising carbon-fibre reinforced polymer composite material. The first shell 102 forms a first vessel having an internal space 122 for storing liquid hydrogen. The second shell 106 forms a second vessel which surrounds the first vessel. Referring specifically to FIG. 2, which shows a portion 100A of the cross-section of the storage tank 100 of FIG. 1, the first 102 and second 106 shells are mechanically coupled by a plurality of pins 103, each of which passes through at least some of the layers of the first shell 102 and at least some of the layers of the second shell 106. The pins 103 are uniformly distributed over 4π steradians with respect to the centre 120 of the storage tank 100, although variants of the tank 100 such pins may have some other spatial and/or areal distribution. The pins 103 are thermally insulating and are manufactured from carbon fibre composite, inorganic fibre composite or cured reinforced glass fibre. As indicated in FIG. 2, the pins 103 extend radially with respect to the centre 120 of the storage tank 100 and are therefore normal to the first and second shells 104, 106, however in variants of the storage tank 100 such pins may meet the shells at an angle or other than 90°. A conduit 130 passes through the first and second shells 102, 106 allowing filling and emptying of the storage tank 100, however the conduit 130 otherwise has no load-bearing function. The inter-sphere cavity 104 between the first 102 and second 106 shells may be evacuated or filled with an insulating material such as foam, aerogel or vermiculite (hydrous phyllosilicate mineral).

Figure 3:
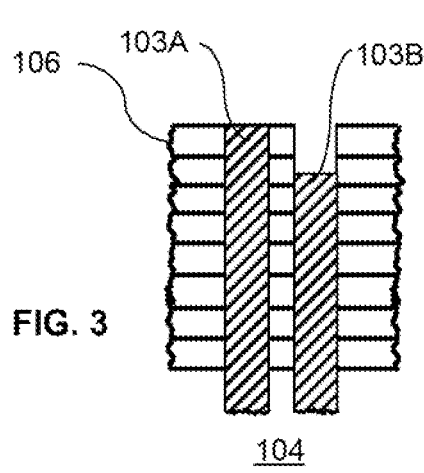
FIGS. 3 & 4 show portions of first and second concentric shells of the FIG. 1 storage tank.
Figure 4:
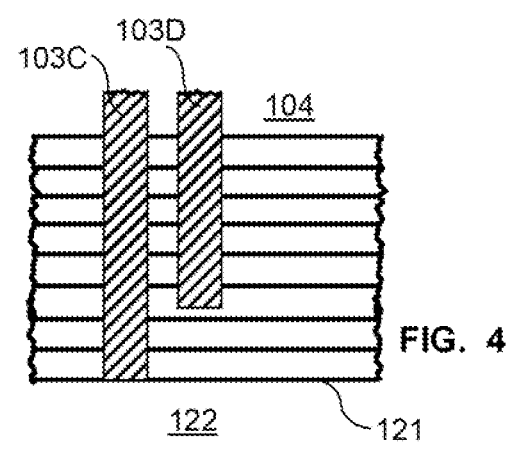

The pins 103 extend through at least some of the layers of the first shell 102 and some of the layers of the second shell 106. FIG. 3 shows a cross section of a portion of the second shell 106: FIG. 4 shows a cross section of a portion of the first shell 102. A pin 103 may have an outer radial portion such as 103A which extends through all layers of the second shell 106, or alternatively an outer radial portion such as 103B which extends through only through a subset of radially inner layers of the second shell 106. A pin 103 may have an inner radial portion such as 103C which extends through all layers of the first shell 102 or alternatively an inner radial portion such as 103D which extends through a subset of outer layers of the first shell 102.

The storage tank 100 may be constructed using a simpler manufacturing process involving less tooling and fewer process steps than is the case for known tanks for storing liquid hydrogen. The storage tank 100 has also has a lower mass and reduced thermal losses compared to tanks of the prior art. The plurality of pins 103 allow for the shells 104, 106 to be thinner, and hence lighter, than similar shells in tanks of the prior art.

The storage tank 100 may be manufactured as follows, in a first step, an internal spherical mandrel tool is prepared, the mandrel tool being collapsible and extractable through an opening in the storage tank 100 after manufacturing operations have been completed. The surface of the mandrel tool provides sufficient rigidity and stability for subsequent winding, pinning and curing operations described below.

In a second stage, the mandrel tool is placed on a suitable automated filament winding machine or automated fibre placement machine and rotated about an axis whilst fibre reinforced polymer tape is wound onto the surface of the mandrel tool under tension and to a prescribed and programmed laminate design which will ultimately produce the first shell 102. The resulting tape winding is consolidated to the required thickness during winding, or in a subsequent vacuum 'debulking' operation.

In a third step, the tape winding is covered by a "washout" core comprising a low-density foam or similar material to define the inter-sphere cavity 104 of the storage tank 100. This material is sacrificial and is removed after moulding is completed.

In a fourth step, tape making up material of the second shell 106 is wound over the 'wash out' core to a required thickness and laminate design using the same filament winding or automated fibre placement equipment as is used in the second step.

In a fifth step, the tape windings for the first and second shells 102, 106 are 'pinned' with the pins 103 that pierce through the tape winding for the second shell 106 and the 'wash-out' core and into the tape winding for the first shell 102. The pins 103 are distributed over a solid angle of approximately $4\pi$ steradians with respect to the centre of the spherical mandrel tool and at angles to the two tape windings and with an areal density and length to meet functional requirements of the storage tank 100. The pins 103 may extend to an inner mould line (IML) 121 against the spherical mandrel tool (as indicated by the radially inner portion 103C of a pin 103 shown in FIG. 4), in which case they pass through the entire thickness of the tape winding for the first shell 102, or alternatively the pins 103 may stop short of the IML 121 (as indicated by the radially inner portion 103D of a pin 103 in FIG. 4). The manufacturing of the pins 103, and their insertion, are performed by methods set out in granted patents U.S. Ser. No. 10/307,973 and U.S. Pat. No. 8,893,367, the entire contents of both of which are hereby incorporated by reference.

In a sixth step, the tape windings and wash-out core are consolidated and cured by application of heat and pressure in order to cross-link matrix resin of the tape windings to achieve properties desired of the laminate shells 102, 106. The mandrel is then extracted.

In a seventh step, the wash-out core defining the inter-sphere cavity 104 is removed, leaving only the pins 103 within the inter-sphere cavity 104. The wash-out core is removed using a method appropriate to the material of the core material, e.g. use of water as a solvent in the case of sugar-based core, use of organic solvent or caustic soda for a polymer-based core, or use of organic solvent (or heat) in the case of a wax core.

Finally, in an eighth step, the inter-sphere space 104 is either evacuated or filled with particulate insulating material.

Figure 5:
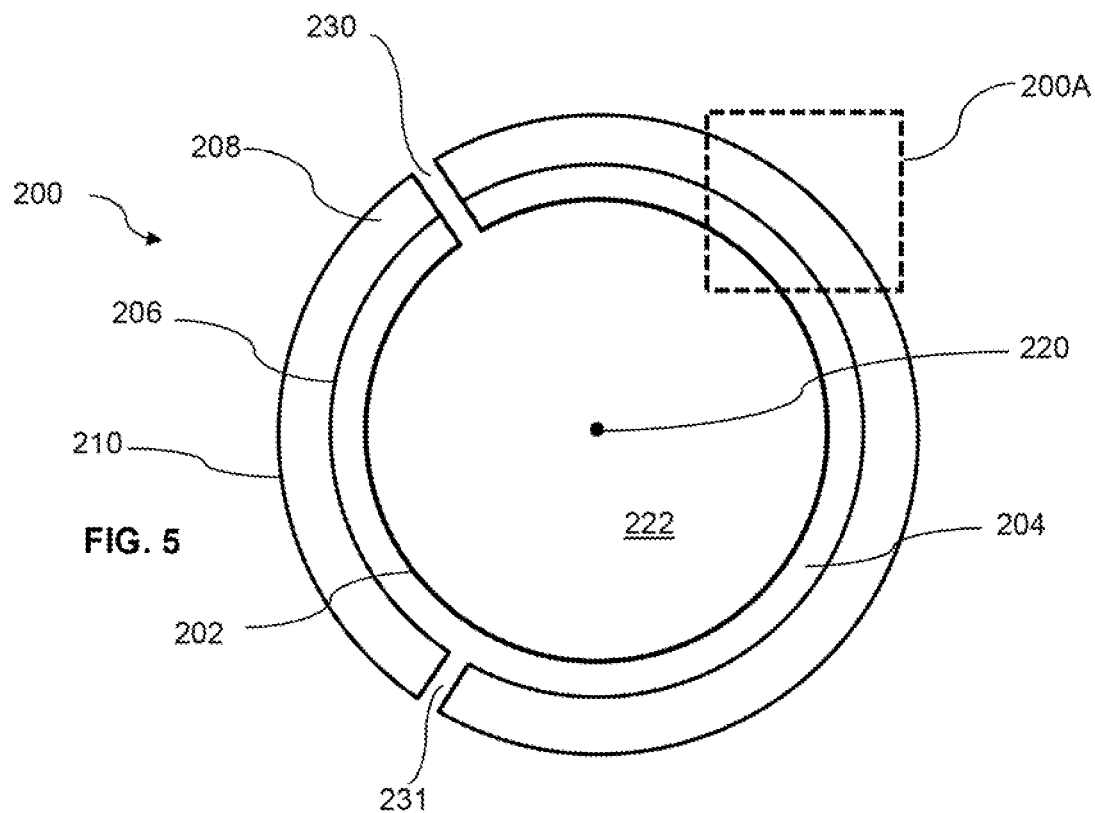
FIG. 5 shows a cross-section of a second example storage tank.
Figure 6:
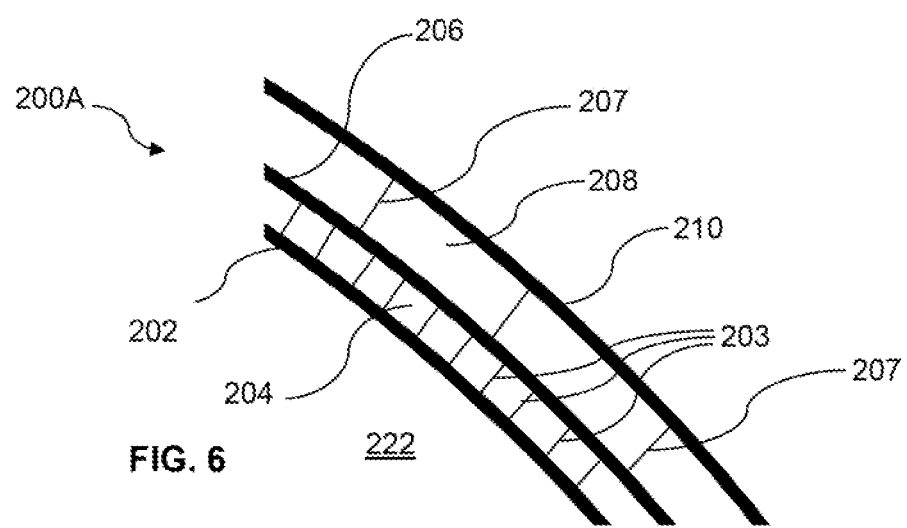
FIG. 6 shows a portion of the cross-section of FIG. 5 in detail.

Referring to FIGS. 5 and 6, a second example storage tank is indicated generally by 200, 200A. The storage tank 200 comprises first 202, second 206 and third 210 concentric spherical shells of carbon fibre reinforced polymer composite laminate material having a common centre 220 and defining first, second and third vessels respectively and first and second inter-sphere spaces 204, 208. The first shell 202 defines a volume 222 for storing liquid hydrogen. A conduit 230 passes through the first, second and third shells allowing the tank to be filled and emptied, but otherwise does not have any mechanical or structural function. A conduit 231 passes through the second and third shells 206, 210 allowing venting of hydrogen which passes through the first shell 202 into the first inter-sphere space 204. The first and second shells 202, 206 are mechanically coupled by a plurality of thermally conducting pins 203, each of which passes through at least some layers of the second shell 206 and at least some layers of the first shell 202.

Figure 7:
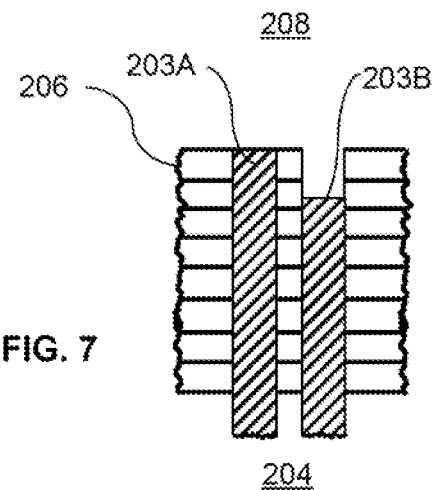
FIGS. 7 & 8 show portions of first and second concentric shells of the FIG. 5 storage tank.
Figure 8:
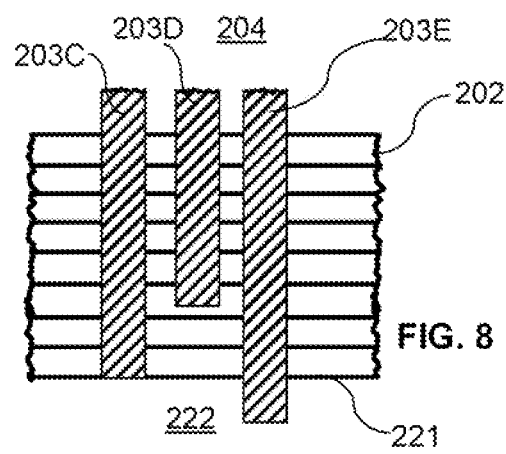

Referring to FIGS. 7 and 8, a pin 203 may have an outer radial portion such as 203A which passes through all layers of the second shell 206 or alternatively an outer radial portion such as 203B which passes through only an inner subset of layers of the second shell 206. A pin 203 may have an inner radial portion such as 203C which passes through all layers of the first shell 202 and up to the inner mould line (IML) 221 of the first shell 202 or alternatively a pin 203 may have an inner radial portion such as 203D which passes through only an outer subset of layers of the first shell. In these cases, the pins 203 are thermally insulating and are manufactured from carbon fibre composite, inorganic fibre composite or cured reinforced glass fibre.

A pin 203 may have an inner radial portion such as 203E which passes through all layers of the first shell 202 and into the interior 222 of the first shell. In this case the pin 203 is thermally conducting, allowing heat to pass from the first inter-sphere space 204 into the interior 222 of the tank 200 and hence providing for active boil-off of liquid hydrogen stored in the volume 222 of the storage tank 200. In this case the outer radial portion of a pin 203 may either pass through all layers of the second shell 206, or only a subset of inner layers of the second shell 206, as indicated by 203A, 203B in FIG. 7.

Figure 9:
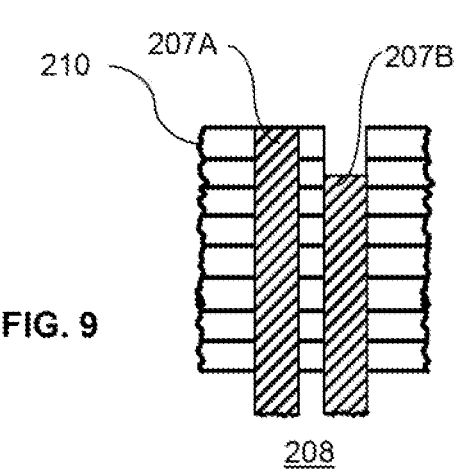
FIGS. 9 &10 show portions of second and third concentric shells of the FIG. 1 storage tank.
Figure 10:
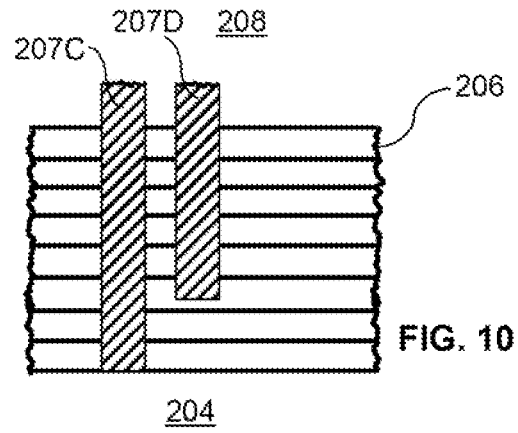

Referring to FIGS. 9 and 10, pins 207 mechanically couple the second and third shells 206, 210 and extend radially with respect to the centre 220 of the tank 200. The pins 207 are thermally insulating and are manufactured from carbon fibre composite, inorganic fibre composite or cured reinforced glass fibre. A pin 207 extends through a least some of the layers of the second shell 206 and through at least some of the layers of the third shell 210. A pin 207 may have an outer radial portion such as 207A which passes through all layers of the third shell 210 or alternatively an outer radial portion such as 207B which passes only through an inner subset of layers of the third shell 210. A pin 207 may have an inner portion such as 207C which passes through all layers of the second shell 206, or alternatively an inner radial portion such as 207D which passes only through a subset of outer layers of the second shell 206.

The areal densities of the pins 203, 207 and/or their number densities per unit solid angle may be constant or may vary in azimuth and elevation.

The storage tank 200 is manufactured by first carrying out the first to fifth steps described above in relation to the storage tank 100 of FIGS. 1 and 2. The following steps are then carried out:

Step 6A: Another core comprising either a wash-out core or insulating foam covers the tape winding for the second shell 206 to define the volume of the second inter-sphere cavity 208. This material is either sacrificial and removed after moulding is completed or forms insulation for the finished tank 200.

Step 7A: A tape winding for the third shell 210 is wound over the wash-out core or insulating foam layer defining the second inter-sphere cavity 208 to the required thickness and laminate design using the same filament winding or automated fibre placement equipment used to apply the tape windings for the first and second shells 202, 206. This tape winding includes provision for any features to stiffen or mount the finished storage tank 200.

Step 8A: The tape winding for the third shell 210 is pinned from its outer surface through and into the tape winding for the second shell 206 using thermally insulating pins 207 and in a pattern and areal density to structurally support the first and second shells 202, 206.

Step 9: Pressure and heat are applied by any one of a number of means in order to consolidate and cross-link matrix resin within the tape windings to achieve the desired laminate properties. The mandrel tooling is then extracted.

Step 10: The wash-out core defining the first inter-sphere cavity 204, and, where present, the wash-out core defining the second inter-sphere cavity 208, is removed as described above in relation to manufacture of the storage tank 100.

Step 11: The second inter-sphere space is either evacuated or filled with insulating material.

Apparatus may be used in conjunction with the tank 200 to recover hydrogen which diffuses from the interior volume 222 of the first vessel into the first inter-sphere space 204. The apparatus may also provide for the temperature and/or pressure of hydrogen within the first inter-sphere space 204 to be regulated.

The manufacture of the first 100 and second 200 example storage tanks may be carried out using automated equipment familiar to those skilled in the art.

What is claimed is:

1. A storage tank for liquid hydrogen, the storage tank comprising a first shell and a second shell, the first shell and the second shell each being constructed of laminate material, the second shell being disposed outwardly of the first shell with respect to the centre of the storage tank and wherein the first and second shells are mechanically connected by a first plurality of pins each of which passes through at least some layers of the second shell and at least some layers of the first shell, wherein the first plurality of pins are uniformly distributed with respect to the centre of the storage tank.

2. A storage tank according to claim 1, wherein the laminate material of at least one of the first and second shells comprises carbon-fibre reinforced polymer composite material.

3. A storage tank according to claim 1, wherein pins of the first plurality of pins comprise one of cured carbon fibre composite material, cured glass fibre reinforced composite material, inorganic fibre composite material, metallic material and non-metallic material.

4. A storage tank according to claim 1, further comprising a third shell constructed of laminate material and disposed outwardly of the second shell and wherein the second and third shells are mechanically connected by a second plurality of pins each of which passes through at least some layers of the third shell and at least some layers of the second shell.

5. A storage tank according to claim 4, wherein laminate material of the third shell comprises carbon-fibre reinforced polymer composite material.

6. A storage tank according to claim 4, wherein pins of the second plurality of pins comprise one of cured carbon fibre composite material, cured glass fibre reinforced composite material, inorganic fibre composite material, metallic material and non-metallic material.

7. A storage tank according to claim 1, wherein the first and second shells are each constructed of carbon fibre reinforced polymer composite material, the first shell forming a first vessel for containing liquid hydrogen and the second shell forming a second vessel spaced apart from and surrounding the first vessel.

8. A storage tank according to claim 7, wherein the pins of the first plurality of pins are thermally insulating.

9. A storage tank according to claim 7, wherein pins of the first plurality of pins have a diameter in the range 250 μm to 500 μm.

10. A storage tank according to claim 7, wherein one or more of the interior and exterior surfaces of the first and second vessels each have a respective metallic coating.

11. A storage tank according to claim 7, wherein the space between the first and second vessels is either evacuated or filled with an insulating material.

12. A storage tank according to claim 7, further comprising a third shell disposed outwardly of the second shell and spaced apart therefrom and constructed of carbon fibre reinforced laminate material, the third shell forming a third vessel surrounding the first and second vessels, the second and third shells being mechanically connected by a second plurality of pins each of which passes through at least some layers of the third shell and at least some layers of the second shell.

13. A storage tank according to claim 12, wherein pins of the first plurality of pins are thermally conductive and pins of the second plurality of pins are thermally insulating.

14. A storage tank according to claim 12, wherein pins of the first and second pluralities of pins have a diameter in the range 250 ▢m to 500 ▢m.

15. A storage tank according to claim 12, wherein one or more of the interior and exterior surfaces of the first, second and third vessels each have a respective metal coating.

16. A storage tank according to claim 12, wherein the space between the second and third vessels is either evacuated or filled with insulating material.

17. A storage vessel according to claim 12, wherein at least some pins of the first plurality of pins extend into the interior of the first vessel.

18. An aircraft comprising the storage tank according to claim 1.

* * * * *